(12) United States Patent
Glance

(10) Patent No.: US 6,240,223 B1
(45) Date of Patent: May 29, 2001

(54) TUNABLE OPTICAL ROUTING DEVICE AND METHOD

(75) Inventor: Bernard Glance, Colts Neck, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/347,092

(22) Filed: Jul. 2, 1999

Related U.S. Application Data

(60) Provisional application No. 60/125,734, filed on Mar. 23, 1999.

(51) Int. Cl.[7] ........................................... G02B 6/28
(52) U.S. Cl. ................................................. 385/24
(58) Field of Search ................... 359/634, 309; 385/24, 147; 372/6

(56) References Cited

U.S. PATENT DOCUMENTS 5,537,258 * 7/1996 Yamazaki et al. ................ 359/634
5,617,243 * 4/1997 Yamazaki et al. ................ 359/309
5,923,683 * 7/1999 Morioka et al. ..................... 372/6

* cited by examiner

*Primary Examiner*—Akm E. Ullah

(57) ABSTRACT

A tunable wavelength selection device has two input ports and two output ports for receiving multiple wavelength channels at each input port and selectively outputting any desired combination of input wavelength channels at the two output ports. Wavelength channels are selected for output at a desired port by filtering and redirecting passed wavelength channels to again pass through the filter, or preventing wavelength channels from being incident on a filter. In exemplary embodiments, at least two filters are disposed between the input and output ports. At least one optical device is associated with at least one of the filters. The optical device selectably directs light that passes through the associated filter back through the associated filter, thereby selecting the wavelength channels for output at the output ports.

20 Claims, 5 Drawing Sheets

TUNABLE OPTICAL ROUTING DEVICE AND METHOD

This non-provisional application claims the benefit of U.S. Provisional Application No. 60/125,734, filed Mar. 23, 1999. U.S. Provisional Application No. 60/125,734 is incorporated herein by reference in its entirety.

BACKGROUND OF THE INVENTION

1. Field of Invention

This invention relates to a tunable optical routing device.

2. Description of the Related Art

Optical communications networks that use wavelength division multiplexing (WDM) require optical routing devices, or add/drop devices, to select one or more wavelength channels from a multiple wavelength channel signal and provide the selected wavelength channel(s) to a subscriber. The add/drop devices also add one or more wavelength channels received from a subscriber to the multiple wavelength channel signal. Thus, a subscriber can receive from an add/drop device a particular wavelength channel and the information contained in the channel, e.g., telephone voice information, add communication information to the channel, and send the channel back to the add/drop device so that the added communication information can be transmitted to another party.

Current add/drop devices are either only capable of adding or dropping a single fixed wavelength channel, or adding or dropping a fixed set of multiple wavelength channels. Devices capable of adding or dropping a fixed set of multiple wavelength channels are not capable of adding or dropping the multiple channels using a single add or drop port, and must instead use multiple add or drop ports, one port for each wavelength channel. In addition, current add/drop devices cannot be tuned to select different sets of wavelength channels. That is, current devices can only select a single fixed channel or a fixed set of channels. Re-tuning of the devices requires that filters or other components of the devices be replaced so that another or additional channels can be added or dropped.

SUMMARY OF THE INVENTION

The invention provides a wavelength routing device that is capable of receiving multiple wavelength channels at each of two input ports and of outputting two different sets of wavelength channels at each of two ports such that the output sets can include channels that were input at both input ports. For example, if channels A, B and C are input at a first input, and channels D, E and F are input at the second input, one set of channels A, B and F can be output at a first output and another set of D, E and C can be output at the second output. The device can be selectively tuned to adjust which received channels are output at each output port.

The invention also provides a tunable add/drop device that can be tuned to selectively add or drop a desired wavelength or set of multiple wavelengths. The add/drop device can be tuned to simultaneously add or drop multiple selected channels using single add and drop ports.

In one aspect of the invention, an input signal received at a first input port of a wavelength routing device includes a plurality of wavelength channels and is incident on at least two filters. The filters can be thin film interferometer filters or other suitable wavelength selection devices. At least one mirror in the device causes a wavelength channel that passes through one of the filters to be directed back through the filter. The mirror can also prevent at least one wavelength channel received at another input port from being incident on the filter. By selectively redirecting wavelength channels to again pass through filters and allowing wavelength channels to pass through filters unimpeded, a selected wavelength channel or channels can be output at one of two desired outputs of the device.

The mirror or mirrors that cause wavelength channels to be redirected through filters in the device can be movable metallic mirrors or other reflective structures. Thus, when a mirror is moved to a first blocking position, the mirror can cause light that passes through a corresponding filter to be redirected and again pass back through the filter, or prevent light from being incident on the filter at all. When the mirror is moved to a second non-blocking position, wavelength channels can be allowed to pass unimpeded through the filter or otherwise be allowed to be incident on the filter. The mirror or mirrors can also comprise structures or devices that can be made selectively transparent or reflective, rather than moved. For example, a mirror can include a field effect transistor that is transparent when in a first state, and a metallic reflector when switched into a second state. Other devices, such as 2x2 optical switches, can be used to cause light to be either re-directed to pass through a corresponding filter or to prevent light from being incident on the corresponding filter altogether.

In one aspect of the invention, a wavelength routing device has a first optical path that communicates with a first output port and a second optical path that communicates with a second output port. At least one filter allows one or more selected wavelength channels to pass from one path to the other. At least one optical device, such as a reflective structure, prevents the one or more selected wavelength channels from passing from one path to the other. Thus, desired wavelengths can be allowed to transfer from one optical path to the other and be output at a desired output port.

These and other aspects of the invention will be apparent and/or obvious from the following description.

BRIEF DESCRIPTION OF THE DRAWINGS

The invention is described with reference to the following drawings in which like numerals reference like elements, and wherein.

DETAILED DESCRIPTION OF PREFERRED EMBODIMENTS

Figure 1:
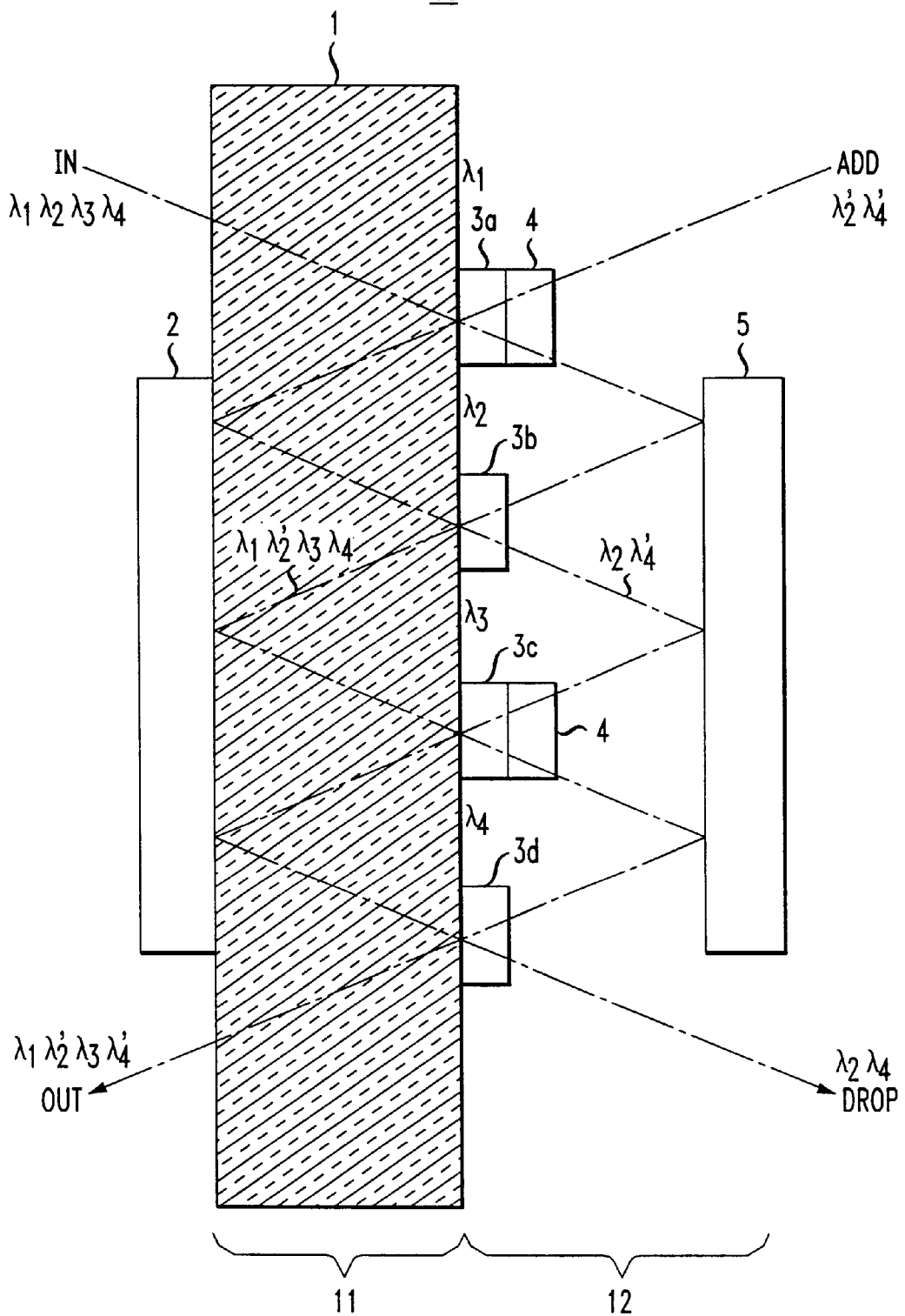
FIG. 1 is a schematic diagram of a first add/drop device.

FIG. 1 shows a first add/drop device 10 that includes a transparent holder 1. The transparent holder 1 can be made of silica or any other suitable material that has the necessary mechanical and optical properties. The transparent holder 1 carries a first mirror 2 that can be a metallic mirror, a multilayer reflective structure, or any other reflective surface. Opposite the first mirror 2 are a plurality of filters 3. The filters 3 are thin film interferometer devices, but can be any other device capable of selecting light of a desired wavelength or wavelengths. Two of the filters 3 have a corresponding mirror 4 that prevents light from passing through or being incident on the corresponding filter 3. A second mirror 5, like the mirror 2, can be a metallic mirror or any other reflective structure or surface.

In this example, the add/drop device 10 is configured to receive a signal at an IN port that includes wavelengths $\lambda_1$–$\lambda_4$ and a signal at an ADD port that includes wavelengths $\lambda'_2$ and $\lambda'_4$. In this example, the prime designation on certain wavelengths is used only to differentiate between signals received at the IN and ADD ports. However, no substantial difference in actual wavelengths is implied. Signals received at the IN port can be received, for example, from a hub node in an optical communications network that uses wavelength division multiplexing (WDM) to provide communications information to subscribers. Signals received at the ADD port, for example, can be received from a subscriber that has added communications information to the signals.

In this example, the signal received at the IN port passes through the transparent holder 1 and is incident on a filter 3a that is configured to pass only light that has a wavelength substantially equal to $\lambda_1$. Other wavelengths are reflected by the filter 3a back into the transparent holder 1 toward the first mirror 2. Thus, the filter 3a passes light of wavelength $\lambda_1$, but reflects light of wavelengths $\lambda_2$–$\lambda_4$. However, since a mirror 4 is provided in association with the filter 3a, light of wavelength $\lambda_1$ is reflected back to the filter 3a and into the transparent holder 1. The mirror 4 also prevents light received at the ADD port from being incident on the filter 3a and reflects the light of wavelengths $\lambda'_2$ and $\lambda'_4$ to the second mirror 5. Thus, as a result of the particular configuration of the add/drop module shown in FIG. 1, light received at the IN port that is incident on the filter 3a is kept within a first light path 11, roughly defined as being within the transparent holder 1, and light received at the ADD port that strikes the mirror 4 corresponding to the filter 3a is maintained in a second light path 12 roughly defined between the filters 3 and the second mirror 5.

Light within the first optical path 11 is next incident on a filter 3b that passes light having a wavelength substantially equal to $\lambda_2$. Thus, light of wavelength $\lambda_2$ passes through the filter 3b into the second light path 12 and light of wavelengths $\lambda_1$, $\lambda_3$ and $\lambda_4$ is reflected by the filter 3b back into the first light path 11. Likewise, light of wavelength $\lambda'_2$ in the second light path 12 passes through the filter 3b and light of wavelength $\lambda'_4$ is kept in the second light path 12. Thus, downstream of the filter 3b, light of wavelengths $\lambda_1$, $\lambda'_2$, $\lambda_3$ and $\lambda_4$ are within the first light path 11, and light of wavelengths $\lambda_2$ and $\lambda'_4$ are within the second light path 12.

Light incident on the filter 3c corresponding to wavelength $\lambda_3$ within the first light path 11 is either reflected by the filter 3c (in the case of wavelengths $\lambda_1$, $\lambda'_2$, and $\lambda_4$) or is reflected by the mirror 4 (in the case of wavelength $\lambda_3$) Light within the second light path 12 is reflected by the mirror 4 and maintained in the second light path 12.

Next, light of wavelengths $\lambda_1$, $\lambda'_2$, and $\lambda_3$ in the first light path 11 is reflected by the filter 3d that passes only light having a wavelength of substantially $\lambda_4$. However, light of wavelength $\lambda_4$ passes through the filter 3d into the second light path 12. Similarly, light of wavelength $\lambda_2$ in the second light path is reflected by the filter 3d and light of wavelength $\lambda'_4$ passes through the filter 3d to the OUT port of the add/drop device 10. Thus, the add/drop device 10 having the specific configuration shown in FIG. 1 outputs wavelengths $\lambda_1$, $\lambda'_2$, $\lambda_3$ and $\lambda'_4$ at the OUT port, and outputs wavelengths $\lambda'_2$ and $\lambda_4$ at the DROP port.

It should be appreciated that the add/drop device 10 can be configured in several different ways, such as adding one or more mirrors 4 to the filters 3, or removing mirrors 4 from the device 10, or moving mirrors 4 to correspond with different filters 3 in the device 10. By changing the configuration of the mirrors 4, i.e., tuning the device 10, different wavelengths or combinations of wavelengths can be selected for output at the DROP and OUT ports of the device 10. In addition, four wavelengths and four filters 3 are used in the device 10 shown in FIG. 1. However, it should be appreciated that signals including more or fewer wavelengths can be received and processed by the device 10, and more or fewer filters 3 or mirrors 4 can be provided for the device 10. The example using four wavelengths and four filters 3 is used above only to describe the invention, and should not be construed as limiting the invention. In addition, the arrangement of the filters 3 and the mirror 4 can be reversed so that the mirrors 4 are positioned closer to the first mirror 2 than the filters 3, or the IN and ADD ports, and thus the OUT and DROP ports, can be switched. Other optically equivalent arrangements will occur to those skilled in the art.

Figure 2:
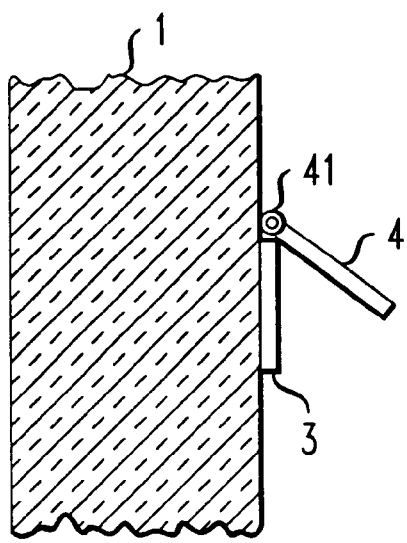
FIG. 2 is a schematic diagram of a movable mirror and corresponding wavelength selection device.

The add/drop device 10 shown in FIG. 1 includes mirrors 4 that are fixed relative to corresponding filters 3. Although the mirrors 4 can be removed, added or moved to tune the device 10 to add and drop desired wavelengths, one or more of the mirrors 4 can be replaced with moveable mirrors 4, such as that shown in FIG. 2. As shown in FIG. 2, the mirror 4 can be rotated about a hinge 41 so that the filter 3 can pass and/or reflect light of desired wavelengths. Thus, the device 10 can be tuned to add and drop desired wavelengths without having to physically add, remove or move mirrors 4 in the device 10. Instead, the mirrors 4 can be selectively rotated to provide desired filtering characteristics for the device 10.

Figure 3:
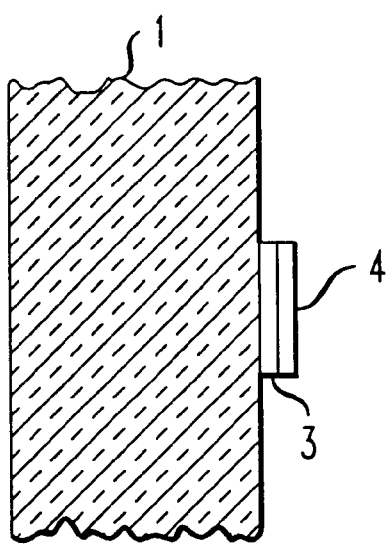
FIG. 3 is a schematic diagram of a device that is selectively reflecting and nonreflecting and a corresponding wavelength selection device.

The mirrors 4 can also be formed from thin film transistors, such as that shown in FIG. 3. Thus, the mirrors 4 can be fixed near a corresponding filter 3 and electrically controlled to be selectively transparent or reflecting. For example, with a semi-conductor having an appropriate band gap, the mirror 4 can be transparent when biased in a depletion state, and be made a metallic reflector when switched into a conducting state.

Figure 4:
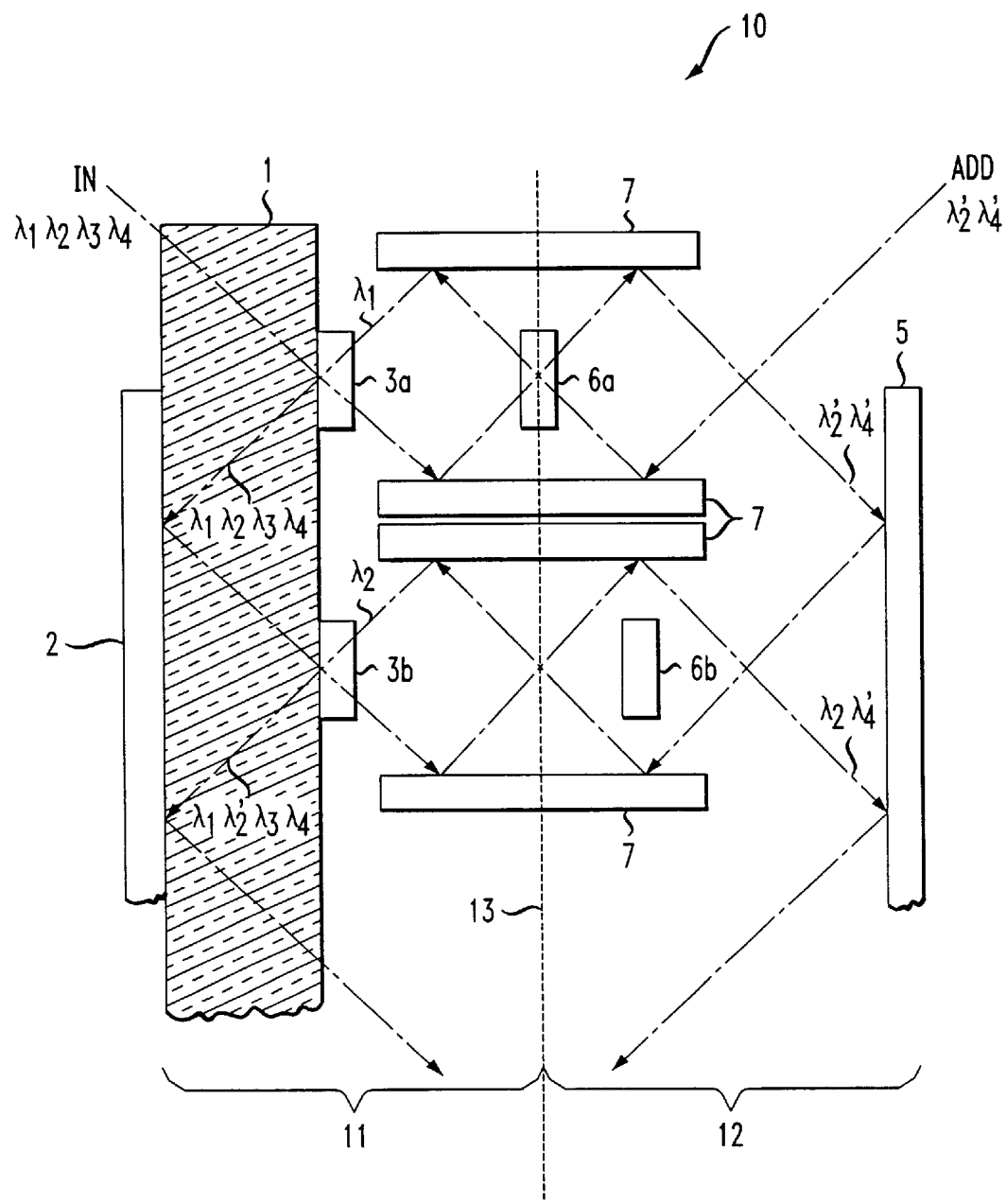
FIG. 4 is a schematic diagram of a second add/drop device having movable mirrors.

FIG. 4 shows a second add/drop device 10. This example is similar to that shown in FIG. 1, but movable mirrors 6 are provided in place of the mirrors 4 at a distance away from the filters 3. In addition, a pair of horizontal mirrors 7 on opposite sides of a corresponding movable mirror 6 are provided between the transparent holder 1 and the second mirror 5. The horizontal mirrors 7 can be metallic mirrors or any other reflective structure or surface. Likewise, the movable mirrors 6 can be metallic mirrors or any other reflective structure or surface.

A signal including light of wavelengths and $\lambda_1$–$\lambda_4$ is received at an IN port and passes through the transparent holder 1 to a first filter 3a that only passes light of a wavelength substantially equal to $\lambda_1$. Thus, the filter 3a reflects light of wavelengths $\lambda_2$–$\lambda_4$ and passes light of wavelength $\lambda_1$. The passed light reflects off a lower horizontal mirror 7, the mirror 6a and an upper horizontal mirror 7 and again passes through the filter 3a. Thus, because the mirror 6a is positioned at the dashed line 13, light of wavelength $\lambda_1$ is not permitted to pass from a first optical path 11, which is roughly defined between the first mirror 2 and the dashed line 13, to the second optical path 12, which is roughly defined between the dashed line 13 and the second mirror 5. Similarly, light received at the ADD port that includes light of wavelengths $\lambda'_2$ and $\lambda'_4$ is reflected by upper and lower mirrors 7 and the movable mirror 6a, and thus reflected by the second mirror 5.

Next, light within the first light path 11 is incident on the filter 3b that passes only light having a wavelength substantially equal to $\lambda_2$. Thus, wavelengths $\lambda_1$, $\lambda_3$ and $\lambda_4$ are reflected by the filter 3b, and wavelength $\lambda_2$ is passed to be incident on a lower horizontal mirror 7. Since the movable mirror 6b is positioned away from the dashed line 13, light from the first optical path 11 is allowed to pass into the second optical path 12. Similarly, light of wavelengths $\lambda'_2$ and $\lambda'_4$ is allowed to pass to the filter 3b. However, light of wavelength $\lambda'_4$ is reflected by the filter 3b back into the second optical path 12, and light of wavelength $\lambda'_2$ is allowed to pass through the filter 3b and is reflected by the first mirror 2. Thus, light of wavelengths $\lambda_1$, $\lambda'_2$, $\lambda_3$ and $\lambda_4$ are contained in the first optical path 11, and light of wavelengths $\lambda_2$ and $\lambda'_4$ is contained in the second optical path 12.

Remaining portions of the device 10 are not shown, but as discussed above, additional filters 3, movable mirrors 6 and horizontal mirrors 7 can be provided to allow additional wavelengths to be selectively added or dropped by the device 10. Similar to that discussed above in connection with FIG. 1, signals in the first optical path 11 are output at an OUT port (not shown) of the device 10, and signals in the second optical path 12 are output at a DROP port (not shown).

Figure 5:
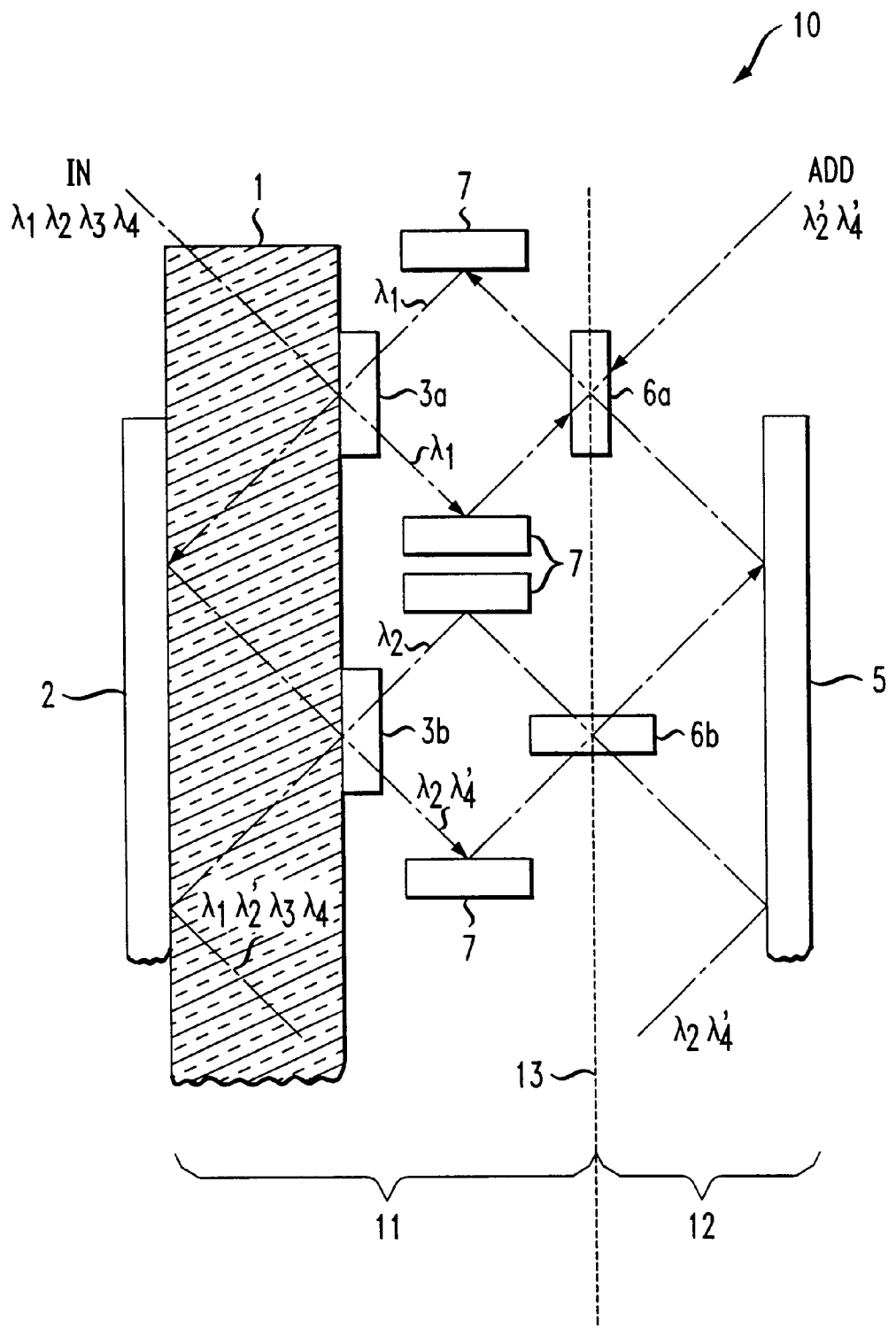
FIG. 5 is a schematic diagram of a third add/drop device having movable mirrors that rotate.

FIG. 5 shows a third add/drop device 10 that is similar to the device 10 shown in FIG. 4, except that the movable mirrors 6 can be rotated rather than moved translationally toward and away from a corresponding filter 3. The movable mirrors 6 can rotate so that light from a first optical path 11 can be reflected back into the first optical path 11 or reflected into the second optical path 12. Likewise, light within the second optical path 12 can be kept in the second optical path 12 or reflected into the first optical path 11.

For example, a signal including wavelengths $\lambda_1$–$\lambda_4$ at the IN port is incident on a filter 3a that passes light of wavelength $\lambda_1$. Thus, wavelengths $\lambda_2$–$\lambda_4$ are reflected by the filter 3a and $\lambda_1$ is passed so that the light is reflected by a lower horizontal mirror 7, the rotatable mirror 6 and an upper horizontal mirror 7 so that the light again passes through the filter 3a into the transparent holder 1.

Light of wavelengths $\lambda_1$, $\lambda_3$ and $\lambda_4$ is then reflected by the filter 3b, and light of wavelength $\lambda_2$ that is incident on the filter 3b is passed, reflected by a lower horizontal mirror 7 and again reflected by the movable mirror 6b into the second optical path 12. Similarly, light of wavelengths $\lambda'_2$ and $\lambda'_4$ in the second optical path 12 is reflected by the movable mirror 6b into the first optical path 11 and is reflected again by an upper horizontal mirror 7 to the filter 3b. The filter 3b passes light of wavelength $\lambda'_2$, but reflects light of wavelength $\lambda'_4$. Thus, light of wavelength $\lambda'_2$ joins other light in the transparent holder 1, while light of wavelength $\lambda'_4$ is reflected by the lower horizontal mirror 7 and the movable mirror 6b back into the second optical path 12.

Similar to that discussed above, the configuration shown in FIG. 5 is only one example, and should not be construed as limiting the invention. For example, additional filters 3, horizontal mirrors 7 and/or movable mirrors 6 can be provided so that additional wavelength channels can be selectively added and/or dropped.

Figure 6:
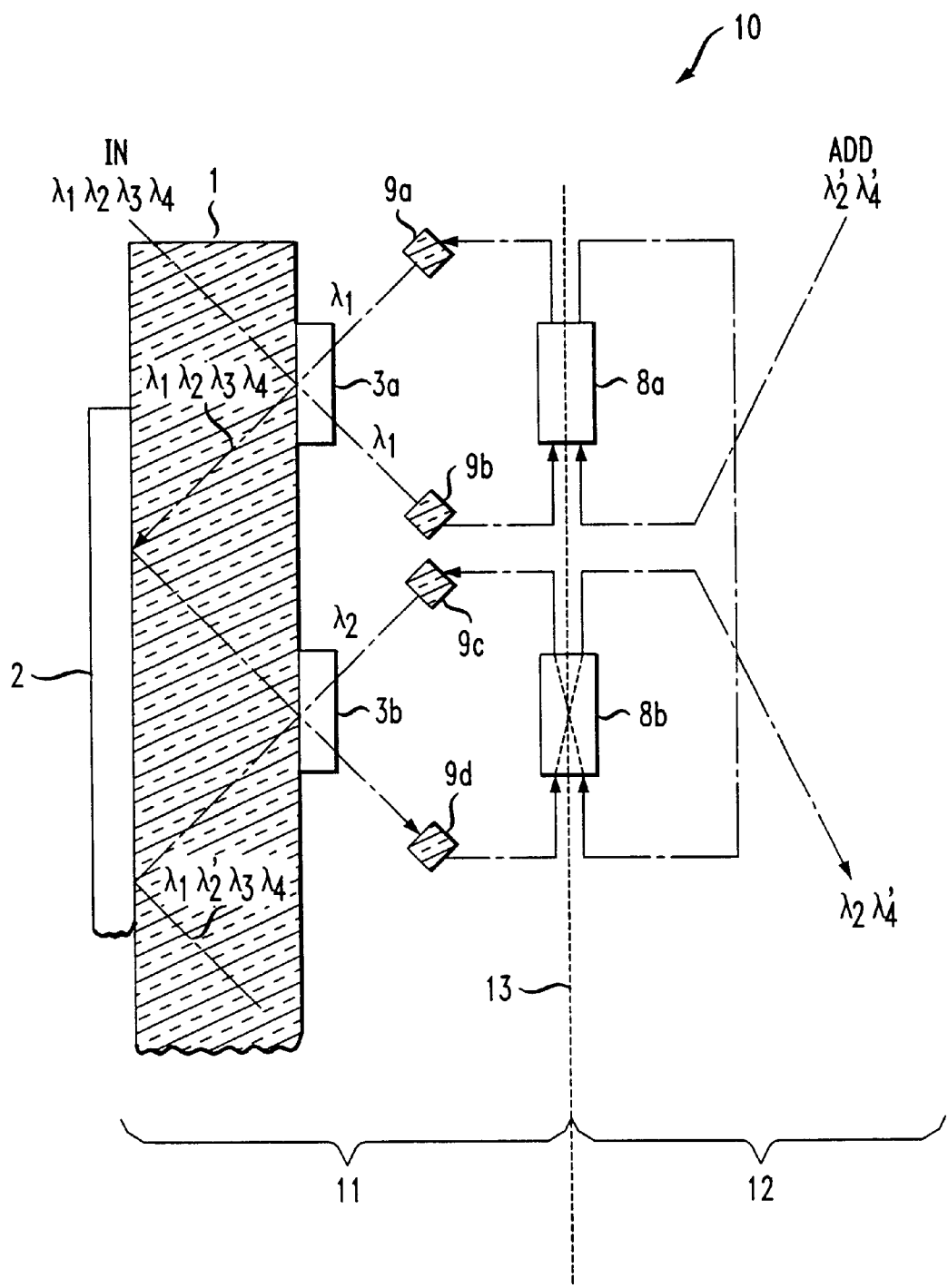
FIG. 6 is a schematic diagram of a fourth add/drop device including optical switches.

FIG. 6 shows a schematic diagram of a fourth add/drop device 10. In this example, light that passes through a filter 3, for example filter 3a, is incident on a lens 9b that directs the light to a switching device, for example the 2×2 optical switch 8a. The optical switch 8a can be selectively switched between two states so that light received at one of the optical switch 8a's inputs can be output to either one of two output ports of the optical switch 8a. In this example, the optical switch 8a outputs light received from the lens 9b to another lens 9a that directs the light back through the filter 3a and into the transparent holder 1. Light received at the ADD port is directed into one of the inputs of the optical switch 8a and, in this case, output to one input of another optical switch 8b.

Light in the transparent holder 1 that is passed by the filter 3b, i.e., wavelength $\lambda_2$, is directed to one of the inputs of the optical switch 8b, which outputs the light of wavelength $\lambda_2$ to another optical switch 8 or the DROP port (not shown) of the device 10. Light received from the ADD port including wavelengths $\lambda'_2$ and $\lambda'_4$ is directed by the optical switch 8b to a lens 9c and is incident on the filter 3b. Light of wavelength $\lambda'_2$ is passed by the filter 3b, but the wavelength $\lambda'_4$ is reflected by the filter 3b to the lens 9d. Thus, light of wavelength $\lambda_2$ and $\lambda'_4$ in the second optical path 12 is directed to the next optical switch 8 or the DROP port, while light of wavelengths $\lambda_1$, $\lambda'_2$ $\lambda_3$ and $\lambda_4$ in the first optical path 11 is directed to a next filter 3 or the OUT port (not shown) of the device 10.

Similar to that discussed above, a device 10 shown in FIG. 6 can include many more filters 3, lenses 9, and/or optical switches 8 so that additional wavelength channels can be selectively output at the OUT and DROP ports of the device 10, the relative positions of the filters 3 and optical switches 8 can be altered, or the IN and ADD, and OUT and DROP ports can be switched.

Although the add/drop devices 10 are described above in connection with an ADD/DROP function, the devices 10 can be used to perform other similar functions, such as a 2×2 tunable frequency router. In this case, the two (2) input ports of the device, e.g., the IN and ADD ports, can be provided with two identical sets of wavelengths, and the device 10 can be tuned to exchange desired wavelengths so that desired sets of wavelengths that each include selected ones of the wavelengths provided at the two input ports are output at the two output ports of the device 10. Since the device 10 can be provided with controllable mirrors 6 or optical switches 8, the device 10 can be actively controlled to tune the device 10 as desired. Of course, other uses of the devices 10 will occur to those skilled in the art.

While the invention has been described in conjunction with the specific embodiments thereof, it is evident that many alternatives, modifications and variations will be apparent to those skilled in the art. Accordingly, embodiments of the invention as set forth herein are intended to be illustrative, and not limiting. Various changes may be made without departing from the spirit and scope of the invention.

What is claimed is:

1. An optical routing device comprising:
   two inputs each for receiving signals including at least one wavelength channel;
   two outputs each for outputting signals including at least one wavelength channel;
   at least two filters between the inputs and outputs, each of the filters passing light only having a wavelength substantially equal to a defined wavelength; and
   at least one optical device associated with at least one of the filters that selectably directs light that passes through the at least one filter back through the at least one filter.

2. The device of claim 1, wherein light that passes through one of the at least two filters and is directed back through the filter is output at a first output, and light that passes through one of the at least two filters and is not directed back through the filter is output at a second output.

3. The device of claim 1, wherein the filters are thin film interferometers.

4. The device of claim 1, wherein the at least one optical device includes a reflecting surface.

5. The device of claim 1, wherein the at least one optical device is a reflective structure that contacts a corresponding one of the at least two filters.

6. The device of claim 1, wherein the at least one optical device is a thin film transistor that is selectively transparent and reflective.

7. The device of claim 1, wherein the at least one optical device is a 2×2 optical switch.

8. The device of claim 1, wherein the at least one optical device is a reflective structure that is positioned away from a corresponding one of the at least two filters and is movable.

9. The device of claim 8, wherein the reflective structure is translationally movable toward and away from the corresponding filter.

10. The device of claim 8, wherein the reflective structure is rotatable relative to the corresponding filter.

11. An add/drop device comprising:

a transparent holder;

a first reflective structure formed on a first side of the transparent holder;

a plurality of filters positioned near a second side of the transparent holder opposite the first reflective structure;

a second reflective structure positioned apart from the filters on the second side of the transparent holder; and at least one mirror corresponding to at least one of the plurality of filters that selectably redirects light that passes through the corresponding filter back through the corresponding filter.

12. The device of claim 11, wherein the mirror is fixed to the corresponding filter.

13. The device of claim 11, wherein the mirror is a thin film transistor that is controllable between a transparent state and a reflecting state.

14. The device of claim 11, wherein the mirror is movable relative to the corresponding filter.

15. The device of claim 14, wherein the mirror is translationally movable away from and toward the corresponding filter.

16. The device of claim 14, wherein the mirror is rotatable relative to the corresponding filter.

17. The device of claim 11, further comprising at least one pair of horizontal reflection surfaces that correspond to a mirror.

18. A wavelength routing device comprising:

first and second input ports each for receiving a signal including at least one wavelength channel;

first and second output ports each for outputting a signal including at least one wavelength channel; and an optical system between the input and output ports that directs a set of wavelength channels including wavelength channels received at the first input port to be output at the first output port, and directs a different set of wavelength channels including wavelength channels received at the first input port to be output at the second output port.

19. The device of claim 18, wherein the optical system is tunable to selectively adjust the sets of wavelength channels output at the first and second output ports.

20. A method for routing two sets of wavelength channels received at two input ports to two output ports, comprising:

receiving first and second sets of wavelength channels at first and second input ports, respectively;

selectively separating wavelength channels from the first and second sets;

outputting a first output set of wavelength channels that includes wavelength channels from both the first and second input sets of wavelength channels; and outputting a second output set of wavelength channels that includes wavelength channels from both the first and second input sets of wavelength channels.

* * * * *